United States Patent Office 3,243,459
Patented Mar. 29, 1966

3,243,459
DIALKYL HYDROXY BENZYL HYDRAZINES AND
THEIR METHOD OF PREPARATION
Francis X. O'Shea, Wolcott, Conn., assignor to United
States Rubber Company, New York, N.Y., a corporation of New Jersey
No Drawing. Filed Apr. 8, 1964, Ser. No. 358,415
8 Claims. (Cl. 260—569)

This application is a continuation-in-part of my application Serial No. 127,470, filed July 28, 1961, and now abandoned.

This invention relates to new chemicals which are useful as essentially non-discoloring, non-staining antioxidants for organic materials normally subject to oxidative deterioration, such as elastomers, polyolefins, fats, petroleum products and other organic materials normally subject to oxidative deterioration.

The new chemicals of the present invention are the 3,5-dialkyl-4-hydroxybenzyl hydrazines represented by the formula

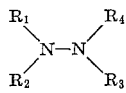

in which $R_1$ is selected from the group consisting of 3-methyl-4-hydroxy-5-tert-butylbenzyl and 3,5-di-tert-butyl-4-hydroxybenzyl radicals, $R_2$ is selected from the group consisting of hydrogen, methyl, 3-methyl-4-hydroxy-5-tert-butylbenzyl and 3,5-di-tert-butyl-4-hydroxybenzyl radicals, and $R_3$ and $R_4$ are selected from the group consisting of hydrogen and methyl.

The chemicals of the present invention are prepared by reacting the selected 2,6-dialkyl-4-(dialkylaminomethyl) phenol in which the 2,6-dialkyl radicals are 2-methyl-6-tert-butyl or 2,6-di-tert-butyl radicals with hydrazine or monomethyl hydrazine or unsymmetrical dimethylhydrazine. The reaction involves a displacement of the dialkylamino group of the 2,6-dialkyl-4-(dialkylaminomethyl) phenol by the hydrazine compound yielding the 3,5-dialkyl-4-hydroxybenzyl hydrazine and a dialkylamine. The alkyl radicals of the dialkylamino group of the 2,6-dialkyl-4-(dialkylamino-methyl)phenol may be alkyl radicals having 1 to 5 carbon atoms, and are preferably methyls since the displacement reaction can be readily followed by evolution of the volatile dimethylamine.

The following reactions are illustrative and show the preparation of 3,5-di-tert-butyl-4-hydroxybenzyl hydrazine and 1,1-bis(3,5-di-tert-butyl-4-hydroxybenzyl) hydrazine and 1,1 - dimethyl - 2 - (3 - methyl-4-hydroxy-5-tert-butylbenzyl) hydrazine of Examples 1, 2 and 3 below

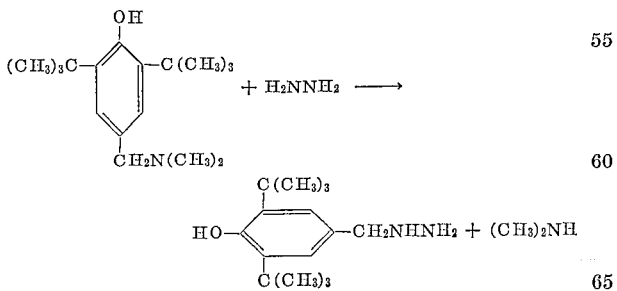

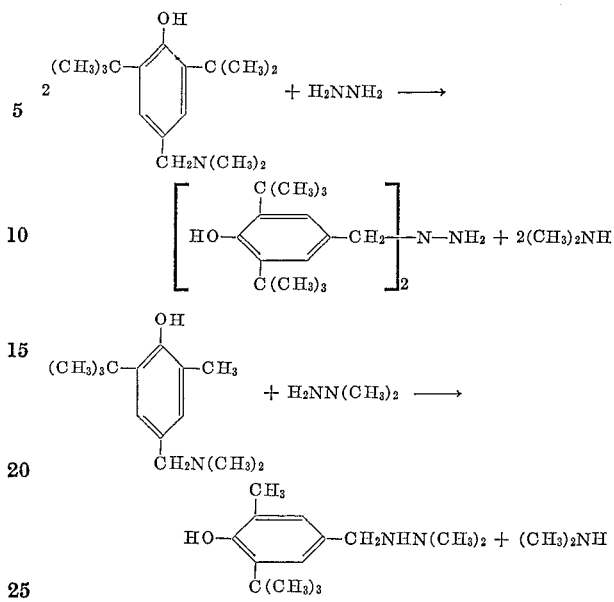

The 2,6-dialkyl-4-(dialkylaminomethyl)phenol starting material may be prepared by treating the selected 2,6-dialkyl phenol, i.e., 2-methyl-6-tert-butyl phenol or 2,6-di-tert-butyl phenol, with formaldehyde and the selected dialkylamine in which the alkyl radicals have 1 to 5 carbon atoms in the ordinary Mannich type reaction. When these dialkyl phenols are reacted with formaldehyde and dimethyl amine, the intermediate 2,6-dialkyl-4 - (dimethylaminomethyl)phenols are formed. When two moles of the above 2,6-dialkyl-4-(dimethylaminomethyl)phenols are reacted with one mole of hydrazine, the corresponding 1,1-bis(3,5-dialkyl-4-hydroxybenzyl) hydrazines are formed. When the above 2,6-dialkyl-4-(dimethylaminomethyl)phenols are reacted with equimolar proportions of unsymmetrical dimethyl hydrazine, the corresponding 1,1-dimethyl-2-(3,5-dialkyl-4-hydroxybenzyl) hydrazines are formed.

The reactions of the 2,6-dialkyl-4-(dialkylaminomethyl)phenols with the hydrazine compounds may be carried out without a solvent by heating under reflux. They may also be carried out in a solvent such as benzene, toluene, xylene, ethanol, isopropanol or diethyleneglycol dimethyl ether. They may be carried out in an excess of the hydrazine compound in preparation of the mono-(3,5-dialkyl-4-hydroxybenzyl)hydrazines. The bis-(3,5-dialkyl-4-hydroxybenzyl) hydrazines may be made by reacting 2 moles of the 2,6-dialkyl-4-(dialkylaminomethyl)-phenol with one mole of the hydrazine compound. The reactions are ordinarily carried out at 50° C. to 150° C. at the reflux temperature of the solution for from ½ to 24 hours.

Examples 1 to 9 illustrate the preparation of the compounds of the present invention.

EXAMPLE 1

*Preparation of 3,5-di-tert-butyl-4-hydroxybenzyl hydrazine*

2,6-di-tert - butyl - 4 - (dimethylaminomethyl)phenol (131.7 g., 0.5 mole) was heated with excess anhydrous hydrazine (200 ml.) under reflux for one hour. Evolution of dimethylamine took place during this time. The reaction mixture was poured over ice and water and the white solid precipitate which formed was filtered off, washed with water, and dried in a 60° C. oven giving 122 g. (98%) of 3,5-di-tert-butyl-4-hydroxybenzyl hydrazine, M. Pt. 137–138° C. Recrystallization of the product from hexanebenzene did not raise the melting point.

*Analysis.*—Calculated percent: C, 72.0; H, 10.5; N, 11.2. Found percent: C, 71.23; H, 10.47; N, 10.93.

EXAMPLE 2

*Preparation of 1,1-bis(3,5-di-tert-butyl-4-hydroxybenzyl) hydrazine*

A solution of 105.2 g. (0.4 mole) of 2,6-di-tert-butyl-4-(dimethylaminomethyl)phenol and 6.4 g. (0.2 mole) of anhydrous hydrazine in 100 ml. of benzene was refluxed for six hours. Evolution of dimethylamine took place. The solution was then cooled and diluted with hexane. The solid which precipitated was filtered off and dried, weight=70 g., M. Pt.=148–152° C. The M. Pt. was raised to 157–159° C. after recrystallization from benzene-hexane.

*Analysis.*—Calculated percent: C, 77.00; H, 10.30; N, 6.00. Found percent: C, 77.00; H, 10.08; N, 6.05.

EXAMPLE 3

*Preparation of 1,1-dimethyl-2-(3-methyl-4-hydroxy-5-tert-butylbenzyl) hydrazine*

2-methyl-4-(dimethylaminomethyl) - 6 - tert-butylphenol (44.2 g., 0.2 mole) was heated under reflux with 20 g. (0.3 mole) of unsym.-dimethylhydrazine for 10.5 hours. Evolution of dimethylamine took place and the pot temperature slowly rose during reflux. The reaction mixture was crystallized from hexane and then recrystallized from benzene-hexane to give 24 g. (51%) of 1,1-dimethyl-2-(3-methyl-4-hydroxy-5-tert - butylbenzyl) hydrazine, M. Pt. 120–122° C.

*Analysis.*—Calculated percent: N, 11.80. Found percent: N, 11.81.

EXAMPLE 4

*Preparation of 1,1-dimethyl-2-(3,5-di-tert-butyl-4-hydroxybenzyl) hydrazine*

2,6-di-tert-butyl-4-(dimethylaminomethyl)phenol (52.6 g., 0.2 mole) was heated with 50 ml. of unsym.-dimethylhydrazine under reflux for six hours. Evolution of dimethylamine took place. The reaction mixture was poured into cold water, an organic layer separating and solidifying. The solid was broken up, washed with water, air dried and recrystallized from low boiling petroleum ether affording 31.8 g. (57%) of 1,1-dimethyl-2-(3,5-di-tert-butyl-4-hydroxybenzyl) hydrazine, M. Pt. 81–83° C.

*Analysis.*—Calculated percent: C, 73.50; H, 10.9; N, 10.0. Found percent: C, 73.81; H, 11.26; N, 9.82.

EXAMPLE 5

*Preparation of 1,1-bis(3-methyl-4-hydroxy-5-tert-butylbenzyl) hydrazine*

A solution of 22.1 g. (0.1 mole) of 2-methyl-4-(dimethylaminomethyl)-6-t-butylphenol and 1.6 g. (0.05 mole) of anhydrous hydrazine in 10 ml. of benzene was refluxed for 2½ hours. The solution was then cooled and diluted with hexane. A crystalline precipitate of 1,1-bis(3-methyl-4-hydroxy-5-tert-butylbenzyl) hydrazine separated. It was filtered off, washed with hexanebenzene and dried, M.P. 135–137°. The yield was 12 g. (63%).

EXAMPLE 6

*Preparation of 1,1-dimethyl-2,2-bis(3,5-di-tert-butyl 4-hydroxybenzyl) hydrazine*

A mixture of 105.2 g. (0.4 mole) of 2,6-di-tert-butyl-4-(dimethylamino methyl)phenol and 12 g. (0.2 mole) of unsym.-dimethylhydrazine was heated to 110° C. Methanol was added in small portions through the condenser until refluxing took place at a pot temperature of 110°. The solution was then refluxed for five hours during which time the pot temperature rose to 140° C. The mixture was then cooled and crystallized from methanol containing a little water. The crystalline precipitate of 1,1 - dimethyl - 2,2-bis(3,5-di-tert-butyl-4-hydroxybenzyl) hydrazine was filtered off, washed with aqueous methanol and dried, M.P. 166–167° C. after recrystallization from hexanebenzene. The yield was 12 g. (12%).

*Analysis.*—Calculated percent: C, 77.4; H, 10.5; N, 5.64. Found percent: C, 77.34; H, 10.40; N, 5.73.

EXAMPLE 7

*Preparation of 1,1-dimethyl-2,2-bis(3-methyl-4-hydroxy-5-tert-butylbenzyl) hydrazine*

A solution of 88.4 g. (0.4 mole) of 2-methyl-4-(dimethylaminomethyl)-6-tert-butylphenol and 12 g. (0.2 mole) of unsym.-dimethylhydrazine in 150 ml. of diethylene glycol dimethyl ether was heated at reflux for seven hours. The solution was poured into water and the product was extracted with a hexane-ether mixture. The organic layer was separated, dried with anhydrous sodium sulfate and evaporated down to a viscous liquid residue. Trituration of this residue with methanol containing a little water caused crystallization of some of the product. It was filtered off, washed with aqueous methanol and dried yielding 6 g. (6.8%) of 1,1-dimethyl-2,2-bis-(3 - methyl - 4 - hydroxy - 5-tert-butylbenzyl) hydrazine, M.P. 139–140° C. The melting point was raised to 142–144° C. after recrystallization from benzene-hexane.

*Analysis.*—Calculated percent: C, 75.68; H, 9.77; N, 6.79. Found percent: C, 75.92; H, 9.73; N, 6.66.

EXAMPLE 8

*Preparation of 1-methyl-1-(3,5-di-tert-butyl-4-hydroxybenzyl) hydrazine*

A solution of 52.6 g. (0.2 mole) of 2,6-di-tert-butyl-4-(dimethylaminomethyl)phenol in 46 g. (1 mole) of monomethylhydrazine was heated at reflux (95° C.) for 3½ hours. The solution was then cooled and poured into water. The product was extracted with a hexane-ether mixture. The organic layer was separated, dried with anhydrous sodium sulfate and evaporated down to a solid residue of 1-methyl-1-(3,5-di-tert-butyl-4-hydroxybenzyl) hydrazine weighing 47 g. (89%). After two recrystallizations from hexane, the melting point was 86–87.5°.

*Analysis.*—Calculated percent: C, 72.8; H, 10.6; N, 10.6. Found percent: C, 72.92; H, 10.67; N, 10.67.

EXAMPLE 9

*Preparation of 1-methyl-1-(3-methyl-4-hydroxy-5-tert-butylbenzyl) hydrazine*

Using the same procedure as Example 8, 2-methyl-4-(dimethylaminomethyl)-6-t-butylphenol was converted to 1-methyl-1-(3-methyl - 4 - hydroxy-5-tert-butylbenzyl) hydrazine in essentially quantitative yield. The melting point of the product was 98–99° C. after recrystallization from hexane-benzene.

*Analysis.*—Calculated percent: C, 70.3; H, 9.91; N, 12.61. Found percent: C, 70.6; H, 9.87; N, 12.66.

EXAMPLE 10

This example demonstrates the usefulness of the compounds of the present invention as fat antioxidants using the Schaal oven aging test. The compounds may be incorporated in the fat in a concentration range of .001% to 1%, preferably .01% to .05%, based on the weight of the fat.

Prime steam pork fat, 150 g., was melted and 15 mg. of the compound under test was mixed in. A peroxide number by the potassium iodide-starch method was then taken as the zero reading. The samples were placed in a 60° C. oven and readings were taken after 3 days and then at one week intervals. A peroxide number of 30 is considered to be failure.

Compound: Days to failure
(1) Blank _____ 3–4
(2) 1,1-bis(3-methyl - 4 - hydroxy-5-tert-butylbenzyl) hydrazine _____ 13–21
(3) 1,1 - bis(3,5 - di - tert - butyl-4-hydroxybenzyl) hydrazine _____ 21–27
(4) 1,1 - dimethyl-2-(3-methyl-4-hydroxy-5-tert-butylbenzyl) hydrazine _____ 56
(5) 1,1-dimethyl - 2 - (3,5-di-tert-butyl-4-hydroxybenzyl) hydrazine _____ 56

EXAMPLE 11

This example demonstrates the usefulness of the compounds of the present invention as antioxidants for polyolefines. The compounds may be incorporated in the polyolefine in a concentration range of .01% to 2% preferably .05% to 0.5%, based on the weight of the polyolefine.

The compound under test was milled into uninhibited polyethylene on the basis of 0.1 part of the antioxidant per 100 parts of polyethylene. A sample film of 5 mil thickness was pressed out and placed in an oven at 140° C. Infrared absorption spectra of the samples revealed a sharp carbonyl development at a time coinciding with visual degradation.

Compound: Hours to failure
(1) Blank _____ 8
(2) 3,5 - di - tert - butyl-4-hydroxybenzyl hydrazine _____ 72
(3) 1,1-dimethyl-2-(3 - methyl - 4 - hydroxy-5-tert-butylbenzyl) hydrazine _____ 72

EXAMPLE 12

This example demonstrates the usefulness of the compounds of the present invention as antioxidants for elastomers, such as natural rubber and synthetic rubber. The compounds may be incorporated in the rubber in a concentration range of .1% to 5%, preferably .5% to 2%, based on the weight of the rubber. Examples of such synthetic rubbers are polymers of butadienes-1,3, e.g. butadiene-1,3, isoprene, 2,3-dimethyl-butadiene-1,3, and piperylene, and mixtures thereof, and copolymers of mixtures of such butadienes-1,3 with up to 70% of such mixtures of monethylenic compounds which contain a $CH_2=C<$ group and are copolymerizable with butadienes-1,3, e.g. styrene, acrylonitrile, and vinyl pyridines. These may be called butadiene polymer synthetic rubbers.

A rubber composition was prepared in accordance with the following recipe:

Pale crepe _____ 98.65
Zinc oxide _____ 10.00
Lithopone _____ 60.00
Finely divided $CaCO_3$ (whiting) _____ 60.00
Zinc laurate _____ .50
Sulfur _____ 3.00
Masterbatch (90% pale crepe-10% tetramethyl thiuram disulfide) _____ 1.50
                                                   _____
                                                   233.65

One part of each compound under test was then milled into 233.65 parts of the above composition and samples were cured at 274° F. for 30 minutes. Tensile bars were aged in an oxygen bomb for 96 hours at 70° C. The percent retention of tensile strength after aging demonstrates the activity of the compounds as rubber antioxidants.

Compound: Percent tensile retained
(1) Blank _____ 0
(2) 3,5-di-tert-butyl - 4 - hydroxybenzyl hydrazine _____ 65
(3) 1,1-bis(3,5 - di - tert-butyl-4-hydroxybenzyl) hydrazine _____ 75
(4) 1,1-dimethyl - 2 - (3,5 - di - tert-butyl-4-hydroxybenzyl) hydrazine _____ 80
(5) 1,1-bis(3-methyl - 4 - hydroxy-5-tert-butylbenzyl) hydrazine _____ 87
(6) 1,1-dimethyl - 2,2 - bis(3-methyl-4-hydroxy-5-tert-butylbenzyl) hydrazine _____ 76
(7) 1,1-dimethyl - 2,2 - bis(3,5 - di - tert-butyl-4-hydroxybenzyl) hydrazine _____ 60

EXAMPLE 13

This example demonstrates the use of the compounds of the present invention as antioxidants for petroleum products, such as lubricating oils and turbine oils. The compounds may be incorporated in the petroleum products in a concentration range of .001% to 5%, preferably .01% to 2%, based on the weight of the petroleum product.

The compounds under test were evaluated in a concentration of 0.1% by weight of a petroleum based lubricating oil using ASTM—D–943 oxidation test for lubricating oils. In the test, a mixture of 300 ml. of the oil and 60 ml. of distilled water is heated to 95° C. under a water cooled condenser. Copper and iron coils are submerged in the system and oxygen is bubbled through at a rate of three liters per hour. The break point or hours to failure is the amount of time required for the acidity of the mixture to rise to an acid number of 2 and/or for heavy sludge to develop with a corresponding large increase in viscosity. The results are shown in the following table:

Compound: Hours to failure
(1) Blank _____ 48
(2) 3,5 - di-tert-butyl - 4 - hydroxybenzyl hydrazine _____ 216
(3) 1,1-bis(3-methyl-4 - hydroxy - 5 - tert-butylbenzyl) hydrazine _____ 360

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A 3,5-dialkyl-4-hydroxybenzyl hydrazine represented by the formula

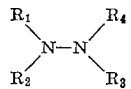

in which $R_1$ is selected from the group consisting of 3-methyl-4-hydroxy-5-tert-butylbenzyl and 3,5-di-tert-butyl-4-hydroxybenzyl radicals, $R_2$ is selected from the group consisting of hydrogen, methyl, 3-methyl-4-hydroxy-5-tert-butylbenzyl and 3,5 - di-tert-butyl - 4 - hydroxybenzyl radicals, and $R_3$ and $R_4$ are selected from hydrogen and methyl.

2. 1,1-bis(3,5-di-tert-butyl-4-hydroxybenzyl) hydrazine.
3. 1,1-bis(3-methyl-4-hydroxy-5-tert - butylbenzyl) hydrazine.
4. 1,1-dimethyl-2,2-bis(3,5-di-tert-butyl-4-hydroxybenzyl) hydrazine.
5. 1,1-dimethyl-2,2-bis(3-methyl-4-hydroxy - 5 - tert-butylbenzyl) hydrazine.
6. 1,1-dimethyl-2-(3,5-di-tert-butyl - 4 - hydroxybenzyl) hydrazine.

7. The method of making a 3,5-dialkyl-4-hydroxybenzyl hydrazine which comprises reacting a 2,6-dialkyl-4-(dialkylaminomethyl)phenol with material selected from the group consisting of hydrazine, monomethylhydrazine and unsym.-dimethylhydrazine.

8. The method of making a 3,5-dialkyl-4-hydroxybenzyl hydrazine which comprises reacting a 2,6-dialkyl-4-(dialkylaminomethyl)phenol in which the 2,6-dialkyl radicals are selected from 2-methyl-6-tert-butyl and 2,6-di-tert-butyl radicals, and in which the alkyl radicals of the dialkylamino group have 1 to 5 carbon atoms, with material selected from the group consisting of hydrazine, monomethylhydrazine and unsym.-dimethylhydrazine.

References Cited by the Examiner
UNITED STATES PATENTS

| | | | |
|---|---|---|---|
| 2,912,387 | 11/1959 | Rakowsky | 252—403 |
| 2,933,532 | 4/1960 | Schumann | 260—569 |
| 2,989,486 | 1/1961 | Peterli et al. | 252—403 |
| 3,042,721 | 7/1962 | Gardner et al. | 260—569 |
| 3,069,383 | 12/1962 | Hoel et al. | 260—45.9 |
| 3,074,907 | 1/1963 | Beaver et al. | 260—45.9 |

CHARLES B. PARKER, *Primary Examiner.*

JOSEPH P. BRUST, *Examiner.*

ROBERT V. HINES, *Assistant Examiner.*